(12) United States Patent
Van Veldhuisen et al.

(10) Patent No.: US 12,363,359 B2
(45) Date of Patent: Jul. 15, 2025

(54) SYSTEM FOR PRESENTATION TIME STAMP RECOVERY FROM A TRANSCODER

(71) Applicant: ARRIS Enterprises LLC, Suwanee, GA (US)

(72) Inventors: Brenda Lea Van Veldhuisen, Portland, OR (US); Robert S. Nemiroff, Carlsbad, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 131 days.

(21) Appl. No.: 18/243,637

(22) Filed: Sep. 7, 2023

(65) Prior Publication Data

US 2024/0146980 A1 May 2, 2024

Related U.S. Application Data

(63) Continuation of application No. 17/234,591, filed on Apr. 19, 2021, now abandoned.
(Continued)

(51) Int. Cl.
*H04N 21/2343* (2011.01)
*H04N 19/40* (2014.01)
(Continued)

(52) U.S. Cl.
CPC ......... *H04N 21/2343* (2013.01); *H04N 19/40* (2014.11); *H04N 21/8456* (2013.01); *H04N 21/8547* (2013.01)

(58) Field of Classification Search
CPC ................................................. H04N 21/2343
(Continued)

(56) References Cited

U.S. PATENT DOCUMENTS 8,191,101 B2   5/2012   Baran et al.
8,269,093 B2   9/2012   Naik et al.
(Continued)

FOREIGN PATENT DOCUMENTS

CN   1655619 A    8/2005
CN   102420981 A   4/2012
(Continued)

OTHER PUBLICATIONS

International Search Report and Written Opinion Re: Application No. PCT/US2021/028010 (dated Jul. 7, 2021).
(Continued)

*Primary Examiner* — Yulin Sun
(74) *Attorney, Agent, or Firm* — Chernoff, Vilhauer, McClung & Stenzel, LLP

(57) ABSTRACT

A method for transcoding a digital video stream that includes transcoding using a transcoder a video stream that includes presentation time stamps for the video stream together with an audio stream that includes presentation time stamps for the audio stream in a manner that modifies the presentation time stamps for the video stream in a manner such that a plurality of first values for presentation time stamps for a first set of video frames of the video stream are modified to a plurality of second values for presentation time stamps for the second set of video frames. The audio stream includes embedded first values for presentation time stamps in a first location. The method includes determining an offset of the second values of the second set of presentation time stamps of the transcoded video stream based upon the first values of the set of presentation time stamps embedded in the audio stream from the transcoder. The method includes combining the transcoded video stream and an associated audio stream based upon the offset. Preferably, the transcoder also modifies the audio time stamps. Preferably,
(Continued)

the audio stream includes the embedded first values. Preferably, the offset is determined by taking the diff between the audio PTS in the PES and the embedded PTS in the audio packet (private data or embedded in the audio frame).

9 Claims, 9 Drawing Sheets

Related U.S. Application Data

(60) Provisional application No. 63/016,496, filed on Apr. 28, 2020.

(51) Int. Cl.
   *H04N 21/845* (2011.01)
   *H04N 21/8547* (2011.01)

(58) Field of Classification Search
   USPC .................................................. 375/240.01
   See application file for complete search history.

(56) References Cited

U.S. PATENT DOCUMENTS

| | | | |
|---|---|---|---|
| 8,682,144 | B1 | 3/2014 | Zhang et al. |
| 9,392,322 | B2 | 7/2016 | Thorson |
| 2007/0274675 | A1 | 11/2007 | Park |
| 2012/0046209 | A1 | 3/2012 | Matsunaga |
| 2012/0076209 | A1* | 3/2012 | Matsunaga ........ H04N 21/4402 375/E7.198 |
| 2017/0023492 | A1* | 1/2017 | Olsson ................... H04N 23/58 |
| 2020/0314468 | A1* | 10/2020 | Kahler ................... G11B 27/10 |

FOREIGN PATENT DOCUMENTS

| | | |
|---|---|---|
| CN | 103929655 A | 7/2014 |
| CN | 103959807 A | 7/2014 |
| CN | 105846940 A | 8/2016 |
| CN | 110213617 A | 9/2019 |
| JP | 2006080919 A | 3/2006 |

OTHER PUBLICATIONS

Office action in Chinese Patent Application No. 202180038940.8, mailed Dec. 17, 2024.

* cited by examiner

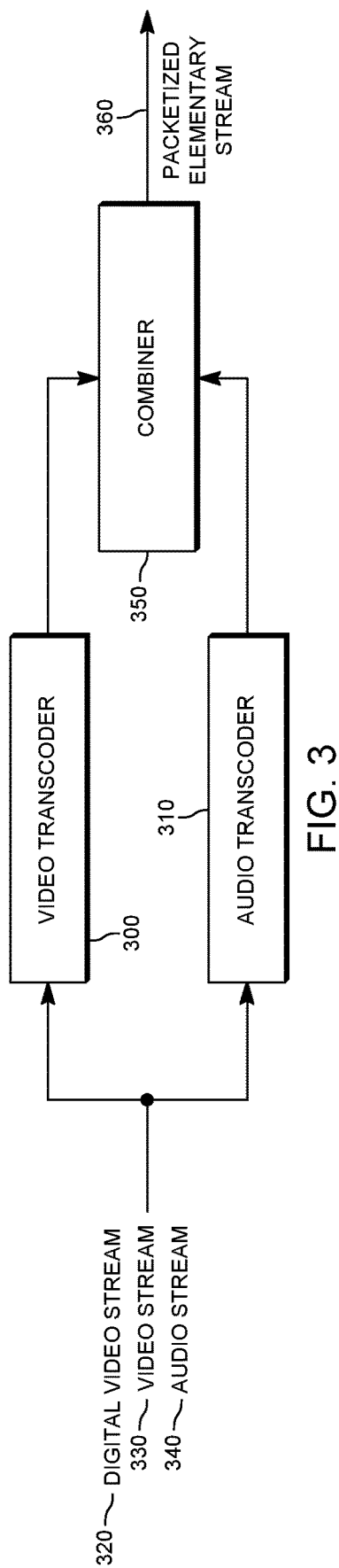

SYSTEM FOR PRESENTATION TIME STAMP RECOVERY FROM A TRANSCODER

CROSS REFERENCE TO RELATED APPLICATIONS

This application is a continuation of U.S. patent application Ser. No. 17/234,591 filed Apr. 19, 2021, which claims the benefit of U.S. Provisional Patent Application Ser. No. 63/016,496 filed Apr. 28, 2020, the complete contents of which is incorporated herein by reference.

BACKGROUND

The subject matter of this application relates to a system for presentation time stamp recovery from a transcoder.

A video transcoding technique using a video transcoder is a process of converting a digital video signal having an initial set of characteristics into another digital video signal having a modified set of characteristics. For example, the modified characteristics of the resulting transcoded digital video signal may have, for example, a different bit rate, a different video frame rate, a different video frame size, a different color characteristic, a different set of video coding parameters, a different lossy video compression technique, and/or a different lossless coding of the video signal.

In many applications, such as a cable broadcast system, a full-resolution master video file is stored as a mezzanine file that is a compressed video file that when rendered is generally visually indistinguishable from a rendering of the full-resolution master video file. The mezzanine file format may be any suitable format, such as for example, an MXF file format or a MOV file format. The mezzanine file stored in a mezzanine file format is often modified to another file format when it is streamed to another device, such as a H.264 video stream, a H.265 video stream, a FLV video stream, an MPEG-1 video stream, an MPEG-2 video stream, an MPEG-4 video stream, a VC-1 video stream, a WMV video stream, a TAPE video stream, a Pores video stream, a DNxHD video stream, or a Cineform video stream.

Often the modified file format is provided from a video distribution server that transcodes the compressed video stream, or the original coded mezzanine file, to a format suitable for distribution to a particular user or group of users. For example, a programmer for a broadcast distribution system may transcode the video stream to a format and/or a bit rate suitable for being distributed by a satellite transmission system to one or more users or groups of users that have a satellite receiver. For example, a headend system for a cable distribution system may transcode the video stream to a format and/or a bit rate suitable for being distributed by an integrated cable management termination system to one or more users or groups of users. For example, a video distribution server may transcode the video stream to a format and/or a bit rate suitable for being distributed through the Internet to one or more users or groups of users.

In some embodiments, as disparate video compression standards have proliferated, such as H.261, H.263, H.264, MPEG-1, MPEG-2, MPEG-4, etc., the demand for convertibility of video streams from one digital video compression type of video streams to another digital video compression type and/or bitrate has steadily increased. In an embodiment of providing a source video stream to a plurality of users, each of which is using a different channel having different capabilities, the video stream is transcoded to a digital video format and/or a bitrate suitable for the particular user. By way of example, a video conferencing system often transmits a plurality of video streams where many of the video streams are transmitted with different respective bit rates over different data channels.

One exemplary transcoder may include a decoder, a transmission port, and an output of an encoder. The decoder may operate in synchronization with a time stamp of an encoder as follows. The encoder includes a main oscillator, which serves as a system time clock (STC), and a counter. The STC belongs to a predetermined program and is a main clock of a program for video and audio encoders.

The time stamps are used for time synchronization of different components with one another. When a video frame or audio block is input to an encoder, the encoder samples the STC from the video frame or the audio frame. A constant indicating a delay between the encoder and the decoder buffer is added to the sampled STC, thereby forming a presentation time stamp (PTS). The PTS is inserted in a header of the video frame or the audio frame.

In the case of reordering video frames, decode time stamps (DTSs), which indicate when each of the video frames is to be decoded by the decoder, are respectively inserted into the video frames. The DTSs, which are used for a frame reordering process, can be the same values as their respective PTSs including I, P, and unreferenced B pictures, and the DTSs and their respective PTSs may be different for I, P, and referenced B pictures. Whenever DTSs are used, PTSs are used.

According to the Advanced Television Systems Committee (ATSC) standard, a PTS or a DTS are inserted into a header of each picture. The encoder buffer outputs transport packets each having a time stamp called program clock reference (PCR) or packetized elementary streams (PES) each having a time stamp called a system clock reference (SCR). The PCR is generated at intervals of 100 msec for MPEG and 40 msec for ATSC, and the SCR is generated at intervals of up to 700 msec. The PCR or SCR is used to synchronize a STC of the decoder with an STC of the encoder.

A program stream (PS) has an SCR as its clock reference, and a transport stream (TS) has a PCR as its clock reference. Therefore, each type of video stream or audio stream has a time stamp corresponding to a STC so as to synchronize the STC of the decoder with the STC of the encoder.

The MPEG based stream includes time information, such as a PCR or SCR, which is used for synchronizing an encoder with a decoder, an STC, and a PTS and a DTS, which are used for synchronizing audio content with video content. The MPEG stream is reconstructed using the decoder, and the time information is discarded after being used to synchronize the decoder with the encoder and to synchronize the audio content with the video content. Unfortunately, in some situations the time stamps are modified in a non-predetermined manner.

What is desired, therefore, are improved systems and methods for effective time stamp management from a transcoder.

BRIEF DESCRIPTION OF THE DRAWINGS

For a better understanding of the invention, and to show how the same may be carried into effect, reference will now be made, by way of example, to the accompanying drawings, in which:

FIG. 3 illustrates a video transcoder and an audio transcoder.

DETAILED DESCRIPTION

Figure 1:
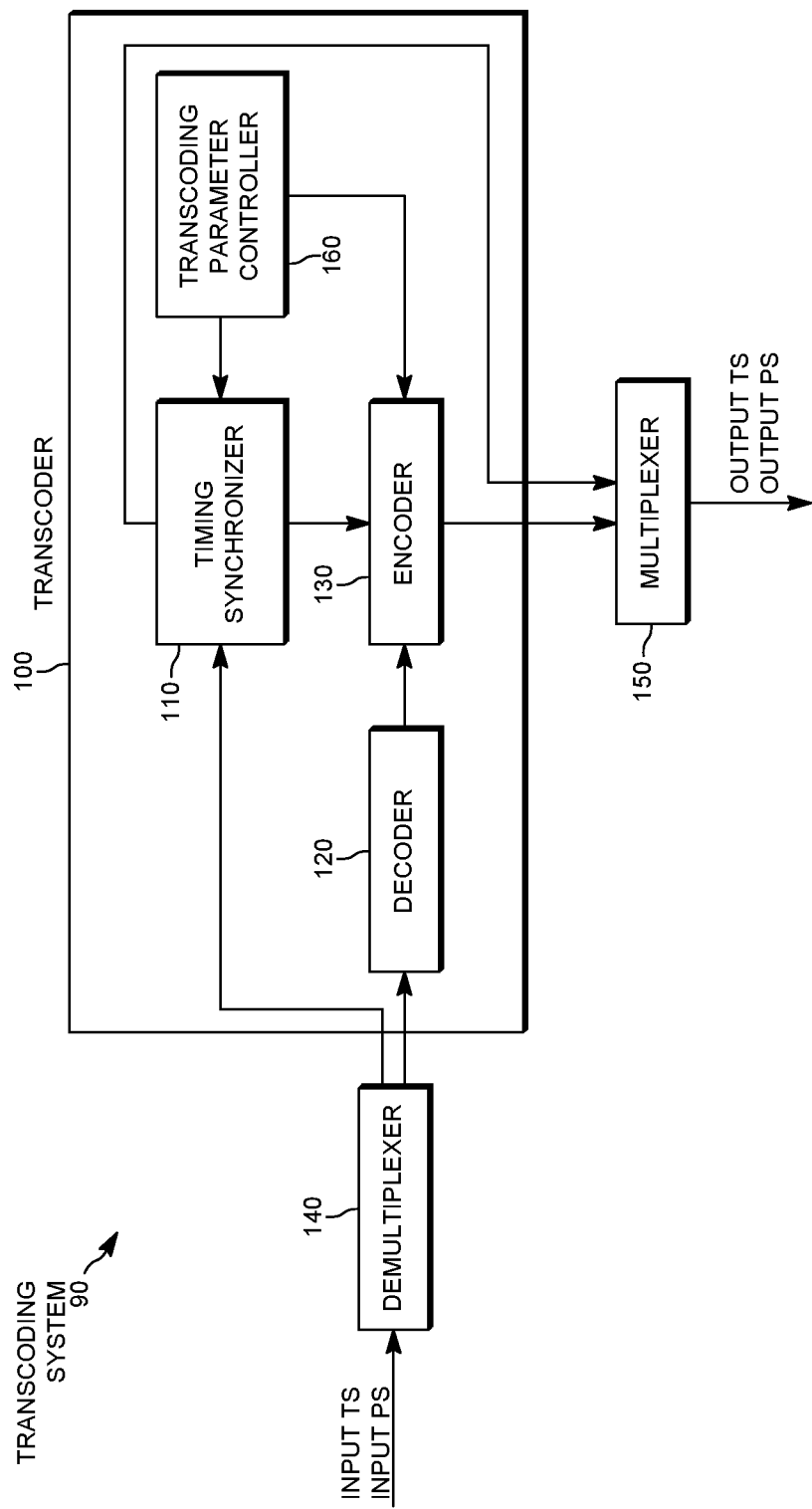
FIG. 1 illustrates a transcoding system.

Referring to FIG. 1, an exemplary transcoding system 90 is illustrated. The transcoding system 90 includes a transcoder 100. The transcoder 100 may include a timing synchronizer 110, a decoder 120, and an encoder 130. The transcoding system 90 may further include a demultiplexer 140 and a multiplexer 150.

The demultiplexer 140 receives an input transport stream (TS) or an input program stream (PS), extracts timing parameters from the input TS or PS, and transmits the extracted timing parameters to the timing synchronizer 110. The demultiplexer 140 extracts video data, that was previously compressed in a predetermined manner, from the input TS or PS and transmits the extracted video data to the decoder 120. In many video coding techniques, the timing parameters include a presentation time stamp (PTS), a decode time stamp (DTS), and a program clock reference (PCR).

The presentation time stamp is a timestamp metadata field in a MPEG transport stream, and other transport streams, that is used to achieve synchronization of the program's separate elementary streams (e.g., video stream, audio stream, subtitle stream, etc.) when presented to the viewer. The presentation time stamp is typically given in units related to a program's overall clock reference, such as a program clock reference (PCR) or a system clock reference (SCR), which is also transmitted in the transport stream or program stream.

The presentation time stamps typically have a resolution of 90 kHz, suitable for the presentation synchronization task. The PCR or SCR typically has a resolution of 27 MHz which is suitable for synchronization of a decoder's overall clock with that of the remote decoder A transport stream may contain multiple programs and each program may have its own time base. The time bases of different programs within a transport stream may be different. Because PTSs apply to the decoding of individual elementary streams, they reside in the PES packet layer of both the transport streams and the program streams. End-to-end synchronization occurs when encoders save time stamps at capture time, when the time stamps propagate with associated coded data to decoders, and when decoders use those time stamps to schedule presentations.

Synchronization of a decoding system with a channel is achieved through the use of the SCR in the program stream and by its analog, the PCR, in the transport stream. The SCR and PCR are time stamps encoding the timing of the bit stream itself and are derived from the same time base used for the audio and video PTS values from the same program. Since each program may have its own time base, there are separate PCR fields for each program in a transport stream containing multiple programs. In some cases, it may be possible for programs to share PCR fields.

The timing synchronizer 110 keeps the timing parameters received from the demultiplexer 140 intact so that they still can be synchronized with segmentation metadata even after the video data has undergone a transcoding process, and transmits the timing parameters to the encoder 130 and the multiplexer 150. The decoder 120 restores the compressed video data received from the demultiplexer 140 to a video sequence using a predetermined decoding method and provides the video sequence to the encoder 130. The encoder 130 compresses the video sequence received from the decoder 120 according to predetermined conditions set by a transcoding parameter controller 160, records the timing parameters received from the timing synchronizer 110 in the compressed video sequence, and transmits the resultant compressed video sequence to the multiplexer 150. The transcoding parameter controller 160 may be configurable based upon user input, such as from a GUI, system determined, and/or based upon a particular application. The transcoding parameter controller 160 determines transcoding conditions suitable for an end user environment and provides the determined transcoding conditions to the encoder 130 and the timing synchronizer 110. The transcoding conditions include, for example, a video quality, a video resolution, a bit rate, and a video frame rate. The multiplexer 150 multiplexes the video sequence received from the encoder 130 creating an output TS or PS. The multiplexer 150 records the timing parameters received from the timing synchronizer 110 in a header of the output TS or PS. The segmentation metadata may have been extracted from the input TS or PS by the demultiplexer 140 or may have been provided by another metadata provider. Other transcoders may likewise be used, as desired.

Merely for matters of convenience, the discussion will be described using a TS rather than a PS as an example. For example, in the following paragraphs, only a PCR will be described as a reference time indicator, but a SCR may also be used as the reference time indicator in a case where a stream input to or output from the transcoding system 200 is a PS. Even if a PCR is input to the transcoding system 200 as a reference time indicator, a SCR may be output from the transcoding system 200 as the reference time indicator, and vice versa.

Figure 2A:
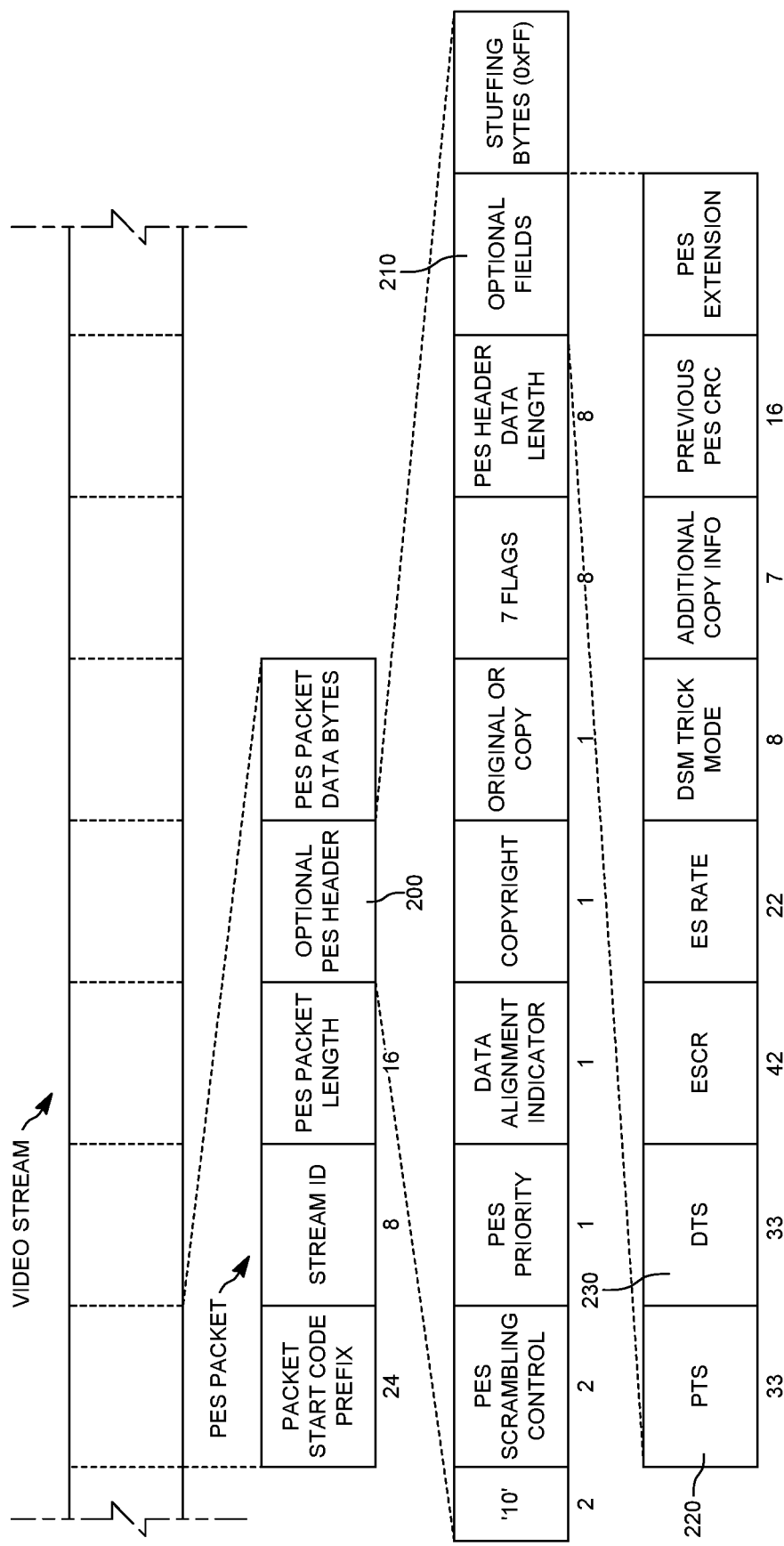
FIG. 2A illustrates an MPEG video Packetized Elementary Stream (PES).
Figure 2B:
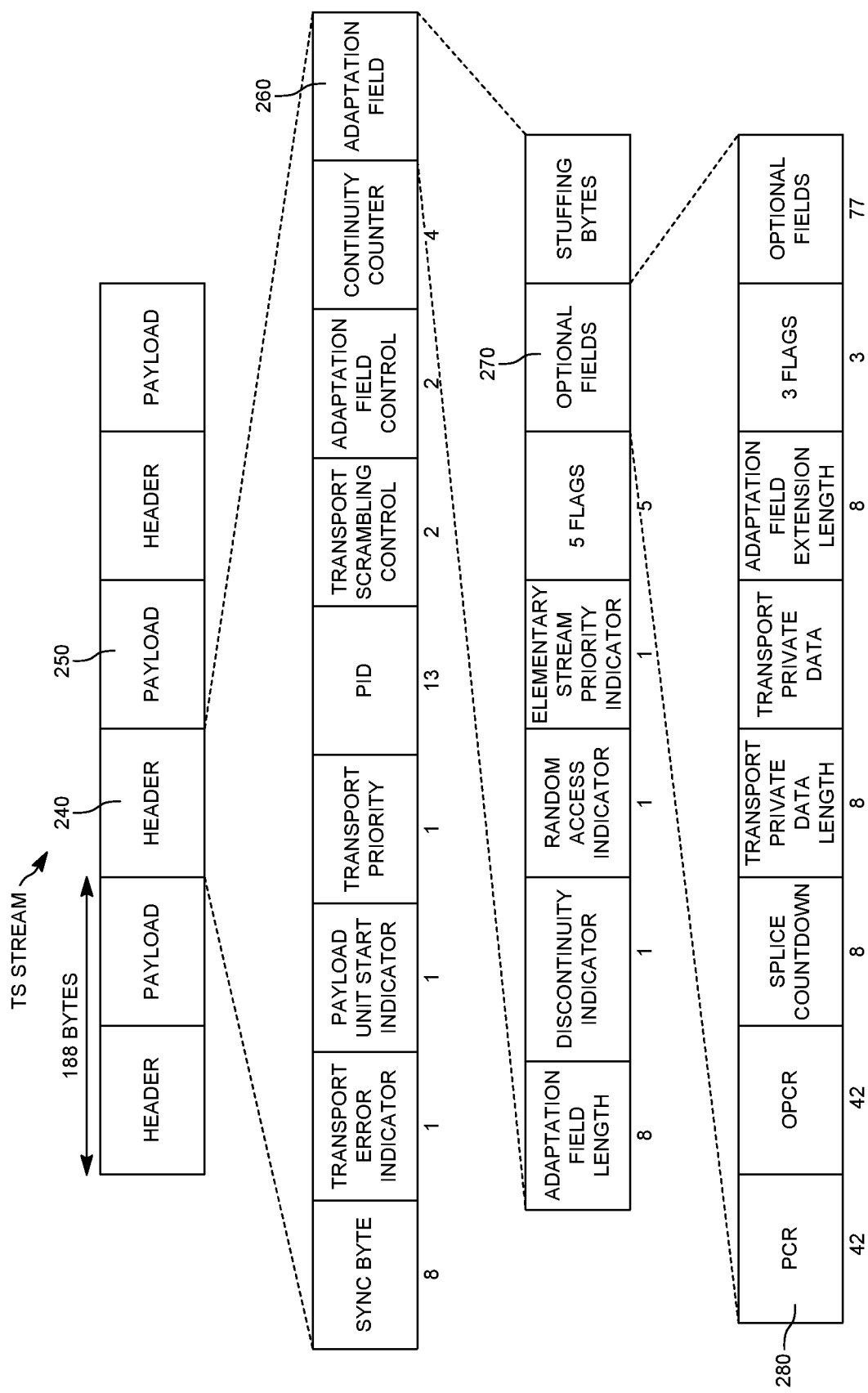
FIG. 2B illustrates an MPEG transport stream.

Referring to FIG. 2A and to FIG. 2B, an MPEG-2 packetized elementary stream (PES) packet and an MPEG-2 TS, respectively, are illustrated. Referring to FIG. 2A, an MPEG-2 video stream, which is compressed using an encoder, is packetized into PES packets. Each of the PES packets includes an optional PES header and a PES packet data field. The optional PES header 200 includes an optional field 210. The optional field 210 includes a PTS field 220 and a DTS field 230. The PTS information is recorded in the PTS field 220, and the DTS information is recorded in the DTS field 230.

Referring to FIG. 2B, a TS, which is formed through a multiplexing process, is 188 bytes long and includes a header 240 and a payload 250. A PES packet or a program association table (PAT), or a program map table (PMT) are contained in the payload 250. The header 240, which starts with sync bytes, includes various fields, such as an adaptation field 260. The adaptation field 260 includes an optional field 270, and the optional field 270 includes a PCR field 280. PCR information, which is reference time information, is recorded in the PCR field 280.

Referring to FIG. 3, in some cases it is desirable to use a particular video transcoder 300 to transcode a video stream 330 of a digital video stream (e.g., packetized elementary stream) 320, and a separate audio transcoder 310 to transcode an audio stream 340 of the digital video stream (e.g., packetized elementary stream) 320. The video transcoder 300 typically also includes the capability of processing a corresponding audio stream and maintaining the synchronization between the received video stream and audio stream. For example, the video transcoder 300 may have desirable transcoding characteristics, such as a very high quality video encoding with relatively low bit rates. For example, the video transcoder 300 may have other desirable transcoding characteristics, such as a software application that is suitable to operate on a common off the shelf server (e.g., a server in a public and/or a private data center). For example, the audio transcoder 310 may have desirable transcoding characteristics, such as a reduced bitrate or a reduced sampling rate. In this manner, the video stream from a digital video stream may be provided to the video transcoder 300 and the audio stream from the digital video stream may be provided to the audio transcoder 310. The output of the video transcoder 300 and the output of the audio transcoder 310 may be combined 350, such as into a packetized elementary stream 360. Unfortunately, as a result of the video transcoding process the video transcoder tends to modify the values of the presentation time stamps in some manner, such that the presentation time stamps associated with a set of video frames are different than the presentation time stamps associated with the same set of video frames resulting from the video transcoder (e.g., such as the relative difference between the respective presentation time stamps is modified). It is problematic to automatically resynchronize the audio stream, as originally provided with the digital video stream or as transcoded by the audio transcoder, because the synchronization has been lost between the audio stream and the video stream because the presentation time stamps of the video stream have been modified in an unknown manner. If the audio stream is not properly aligned with the video stream, then the audio content will not match the corresponding video content. It is noted that the PTSs of the video stream and the corresponding PTSs of the audio stream are normally different numbers, but the known difference between the distinct PTS numbers (e.g., video stream and audio stream) provides the synchronization.

Figure 4:
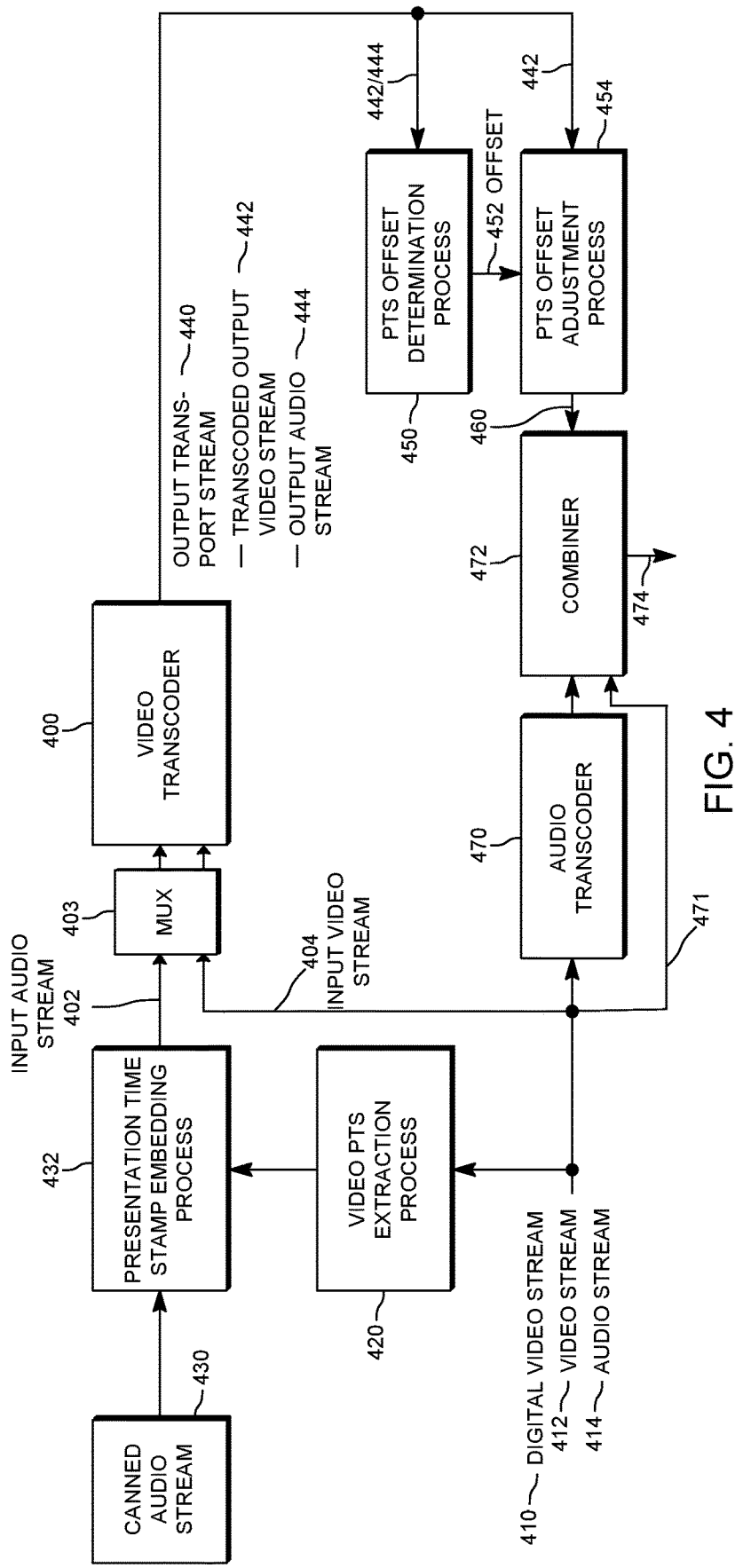
FIG. 4 illustrates an exemplary transcoding system with PTS recovery.

Referring to FIG. 4, it was determined that since the video transcoder 400 tends to modify the presentation time stamps encoded together with the video stream from that provided at its input to modified presentation time stamps provided from its output, it is desirable to recover the original presentation time stamps provided to the input of the video transcoder 400 in some manner. Typically the video transcoder 400 includes the capability of processing an input audio stream 402 and an input video stream 404 (such as being provided separately or otherwise encoded together as a packetized elementary stream), while maintaining a synchronization of the video stream 404 and the corresponding audio stream 402 at its output thereof. With the understanding that the synchronization of the video stream 404 and the corresponding audio stream 402 is maintained by the video transcoder 400 during the transcoding process, it was determined that the presentation time stamps of the input video stream 404 may be encoded within the input audio stream 402, in a suitable manner, that passes through the video transcoder 400 unchanged. With the presentation time stamps of the input video stream 404 embedded within the audio stream 402, such that the presentation time stamps remain unchanged as a result of the transcoding process, may be used to resynchronize the video stream 404 with an original audio stream 414 of a digital video stream 410 that includes both a video stream 412 and the audio stream 414. The video stream 412 is provided to the video transcoder 400 as the input video stream 404.

A video PTS extraction process 420 may process the video stream 412 of the digital video stream 410 to extract the presentation time stamps associated with the video stream 412. A canned audio stream 430 is provided by the system to a presentation time stamp embedding process 432 that also receives the extracted presentation time stamps associated with the video stream 412. The extracted presentation time stamps from the video stream 412 are embedded within the canned audio stream 430 by the presentation time stamp embedding process 432. The presentation time stamp embedding process 432 embeds the presentation time stamps within the canned audio stream 430 in a manner that remains unchanged as a result of the transcoding process of the video transcoder 400 and provides the input audio stream 402. The input audio stream 402 is synchronized with the input video stream 404 (such as being provided separately or otherwise encoded together as a packetized elementary stream) and is provided to the video transcoder 400 using a multiplexer 403. The video transcoder 400 provides an output transport stream 440 that includes both a transcoded output video stream 442 and an output audio stream 444. The output audio stream 444 includes the embedded presentation time stamps that remain unchanged as a result of the transcoding process.

For example, the presentation time stamps embedded within the separate audio stream 430 may be encoded within a private data portion of the encoded data stream. The private data portion may include, for example, one or more of the following, (1) a transport stream packet table 2-2; (2) a transport stream adaptation field table 2-6; (3) a packetized elementary stream packet table 2-17; (4) a packetized elementary stream packet header; (5) a packetized elementary stream packet data byte field; (6) a descriptor within a program stream and/or a transport stream; and (7) a private section table 2-30.

A presentation time stamp offset determination process 450 receives the transcoded output video stream 442 and the output audio stream 444 and extracts the presentation time stamps from the output video stream and extracts the embedded presentation time stamps and the normal presentation time stamps from the output audio stream 444. In this manner, three different presentation time stamps may be extracted from the data obtained from the video transcoder 400. The comparison of the presentation time stamps from the canned audio stream 404 with the presentation time stamps that were embedded within the input audio stream 402 provides an offset 452 between the two presentation time stamps which corresponds to the offset between the time stamps of the transcoded output video stream 442 and the video stream 412. The offset 452 is added to presentation time stamps of the transcoded output video stream 442 by an PTS offset adjustment process 454, to provide a transcoded video stream with adjusted presentation time stamps 460. The offset 452 may also be used to adjust the program clock references of the transcoded output video stream 442. The offset 452 may also be used to adjust the decode time stamps of the transcoded output video stream 442. The output audio stream 444 after extracting time stamps may be discarded, if desired.

An audio transcoder 470, if included, is used to transcode the audio stream 414 of the digital video stream (e.g., packetized elementary stream) 410. The output of the audio transcoder 470 may be combined 472 with the transcoded video stream with adjusted presentation time stamps 460, such as into a packetized elementary stream 474. Also, the audio stream 414 may pass-through 471 (which may include a buffer) to the combiner 472.

In another embodiment, the canned audio stream 430 may be replaced by the audio stream 414, where the presentation time stamps from the video stream 412 are embedded therein in a manner that are not modified as a result of the transcoding process by the video transcoder 400. The audio stream from the transcoding process of the video transcoder 400 may be discarded after extracting time stamps, if desired.

In another embodiment, the transcoding video process may include a 3:2 pulldown technique, so that there is not a one-to-one match between the video frame into the video transcoder and the video frames out of the video transcoder. The 3:2 pulldown technique converts 24 frames per second into 29.97 (or 30) frames per second. In general, this results in converting every 4 frames into 5 frames plus a slight slowdown in speed when converting 24 frames per second into 29.97.

Preferably, the input video stream is not modified to include the presentation time stamps in the private data sections for the video transcoder, to reduce the likelihood of introducing errors. Also, potentially there may not be available space to include the presentation time stamps in the input video stream. Moreover, in some cases the transcoder may drop the private data field when it generates the output PES header. Alternatively, the input video stream may be modified to include the presentation time stamps in a private data section that is not modified by the video transcoder.

Preferably, the input audio stream is not modified to include the presentation time stamps in the private data sections for the video transcoder, to reduce the likelihood of introducing errors. Moreover, in some cases the transcoder may drop the private data field when it generates the output PES header. Also, potentially there may not be available space to include the presentation time stamps in the audio stream of the digital video stream.

Figure 5:
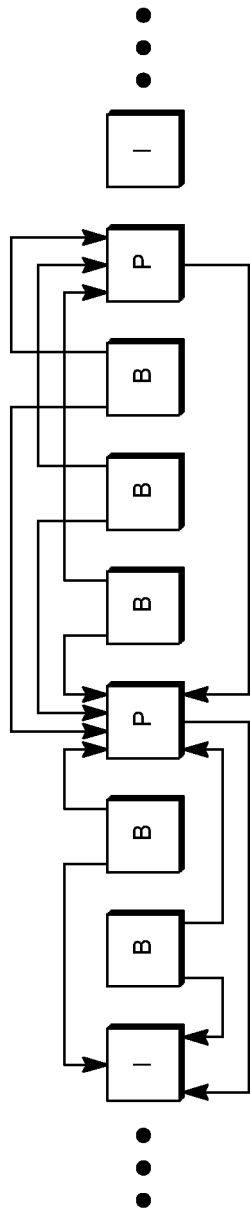
FIG. 5 illustrates a set of I, B, and P pictures.

Referring to FIG. 5, many encoding schemas for a video stream include intra frames (i.e., I frames) that are pictures compressed based upon information only within the frame. The video stream may also include predicted frame (i.e., P frames) that are pictures predicted at least in part from previous I or P frames. The video stream may also include bi-directional predicted frames (i.e., B frames) that use past and future I and P frames for motion compensation. Depending on the type of encoding schema used, other types of frames may be used.

Figure 6:
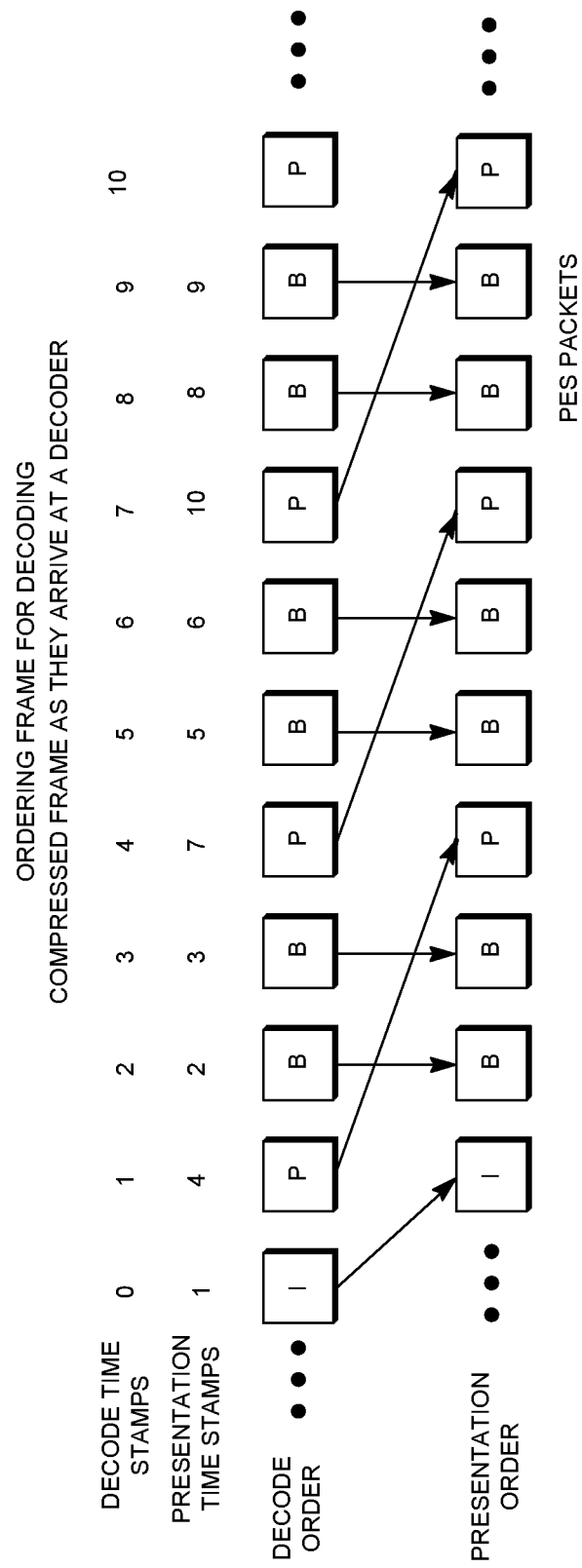
FIG. 6 illustrates the ordering of a set of I, B, and P pictures.

Referring to FIG. 6, in order for the decoder to reconstruct a B-frame from the preceding I and following P frames, both of the I and the following P frames should arrive before the B-frame. Accordingly, the order of frame transmission is different than the order they appear when presented. The use of the decode time stamps, which inform the decoder when to decode the frames, and the presentation time stamps, which inform the decoder when to render the frames accommodate for the timing of the decoding and rendering of the frames.

The Advanced Television Systems Committee (ATSC) for MPEG-2 provides for a resolution of 1920×1080 progressive video has a frame rate of 23.976, 24, 29.97, or 30 frames per second. ATSC provides for MPEG-2 a resolution of 1920×1080 interlaced video has a frame rate of 29.97 frames (59.94 fields), or 30 frames (60 fields) per second. ATSC provides for MPEG-2 a resolution of 1280×720 progressive video has a frame rate of 23.976, 24, 29.97, 30, 59.94, or 60 frames per second. ATSC provides for MPEG-2 a resolution of 704/858×480 progressive video (SMPTE259M) has a frame rate of 23.976, 24, 29.97, 30, 59.94, or 60 frames per second. ATSC provides for MPEG-2 a resolution of 704/858×480 interlaced video (SMPTE259M) has a frame rate of 29.97 frames (59.94 fields) or 30 frames (60 fields) per second. ATSC provides for MPEG-2 a resolution of 640× 480 progressive video has a frame rate of 23.976, 24, 29.97, 30, 59.94, or 60 frames per second. ATSC provides for MPEG-2 a resolution of 640×480 interlaced video has a frame rate of 29.97 frames (59.94 fields) or 30 frames (60 fields) per second. ATSC also supports other PAL frame rates and resolutions and supports the H.264 video codec with other frame rates and resolutions.

By way of example, for MPEG-2 with a resolution of 1920×1080 progressive video with a frame rate of 29.97 frames per second, the presentation time stamps are incremented by 3003 (with a 90 kHz clock resolution) between frames when properly incremented. In a similar manner, for H.264 with a resolution of 1920×1080 interlaced video with a field rate of 59.94 fields per second and field coded pictures, the presentation time stamps are incremented by a sequence of 1501/1502/1501/1502/ . . . (with a 90 kHz clock resolution) between fields when properly incremented. It is noted that 1501+1502 (for two sequential fields) is 3003 which is the frame rate. Accordingly, the presentation time stamps should be incremented between frames or fields in a uniform and consistent manner.

The video transcoder, which modifies the presentation time stamps associated with particular video frames of the video content between its input and its output, has a tendency to create modified presentation time stamps that are offset by 1. This process of variability in the presentation time offsets from the preferred values tends to continue over time. Many presentation devices and associated decoders will tend to decode and render the frames in a suitable manner, even with jitter in the values of the presentation time stamps. Unfortunately, some presentation devices and associated decoders may tend to improperly decode and render the frames in a suitable manner when sufficient jitter exists in the values of the presentation time stamps. Moreover, since the decode time stamps are often the same as the presentation time stamps for I and P frames, and appropriately modified for B-frames, the decode time stamps will likewise include jitter in the values if the presentation time stamps include jitter in the values. The video transcoder may introduce jitter into the presentation time stamps and/or the determination of the offset (previously described) may introduce jitter into the presentation time stamps. In either case, it is desirable to reduce the amount of jitter in the presentation time stamps, including the decode time stamps, to decrease the likelihood of the failure of the decoding and/or presentation of the video content.

Figure 7:
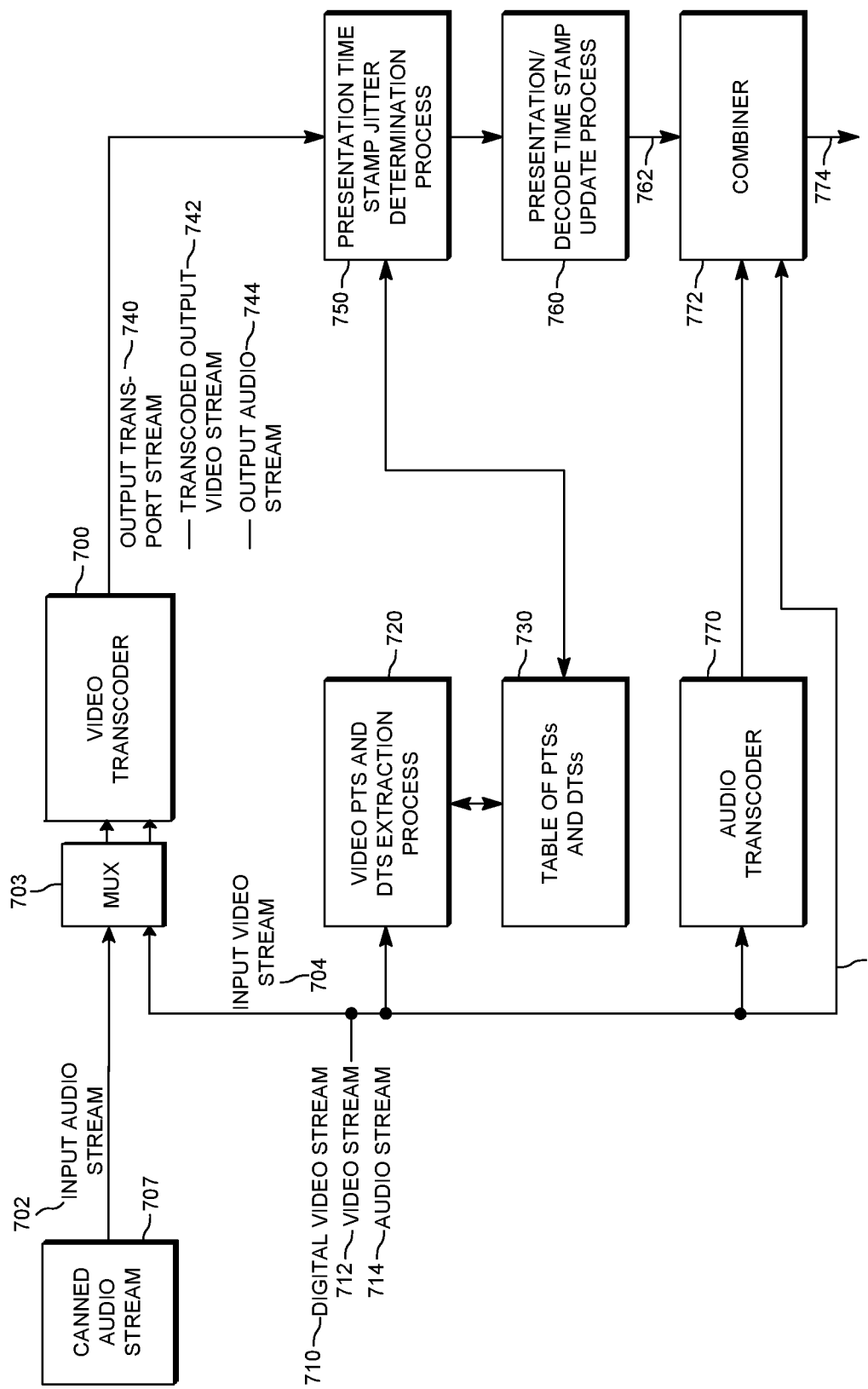
FIG. 7 illustrates an exemplary transcoding system with PTS recovery and dejitter.

Referring to FIG. 7, it was determined that since the video transcoder 700 has a tendency to modify the presentation time stamps encoded together with the video stream from that provided at its input to modified presentation time stamps provided from its output, in a manner that includes jitter in its values, it is desirable to remove or otherwise reduce the amount of jitter in the resulting presentation time stamps. Typically the video transcoder 700 includes the capability of processing an input audio stream 702 from a canned audio stream 707 that uses the most recent video PTS for the audio PES PTS header and putting the most recent video PTS in the audio frame (or private data), and an input video stream 704 using a multiplexer 703 (such as being provided separately or otherwise encoded together as a packetized elementary stream), while maintaining a synchronization of the video stream 704 and the corresponding audio stream 702 at its output thereof.

A digital video stream 710 includes both a video stream 712 and an audio stream 714. The video stream 712 of the digital video stream 710 is provided to the video transcoder 700 as the input video stream 704. The audio stream 714 of the digital video stream 710 may be provided to the video transcoder 700 as the input audio stream 702.

As a result of the video transcoder modifying the presentation time stamps, it is desirable to read the presentation time stamps from the video stream 712 that is being provided to the video transcoder 700 by a video PTS and DTS extraction process 720. Since the decode time stamps are also modified by the video transcoder 700, it is also desirable to read the decode time stamps from the video stream 712 that is being provided to the video transcoder 700 by the video PTS and DTS extraction process 720. The presentation time stamps and the decode time stamps for a temporal time period are stored in a table 730. The table 730 preferably includes a defined temporal window of time for which data is retained, such as 10 seconds. In this manner, as new presentation time stamps and decode time stamps are added to the table 730 the older presentation time stamps and decode time stamps are removed from the table 730.

The input audio stream 702 is synchronized with the video stream 704 (such as being provided separately or otherwise encoded together as a packetized elementary stream) and is provided to the video transcoder 700. The video transcoder 700 provides an output transport stream 740 that includes both a transcoded output video stream 742 and an output audio stream 744. In general, the jitter adjustment may be as follows (described in more detail below). For the output audio stream 744 it includes PES headers that includes both the original PTS and the jittered PTS from the video transcoder 700, with a difference being an offset. The offset is subtracted (or added depending on the manner of computing the difference), from the video PTS/DTS/PCR. The output PTS+offset corresponds to the input PTS in the table except for jitter. The system determines the closest input PTS that matches the output PTS+offset. Note that the system adds the offset to the PCR as well such that the PTS/DTS and PCR are all adjusted to the same offset.

A presentation time stamp jitter determination process 750 receives the transcoded output video stream 742 and output audio stream 744, and extracts the jittered presentation time stamps from the PES header of both audio and video as well as the original video PTS embedded in the audio stream. For the output audio stream 744 it includes PES headers that includes both the original PTS and the jittered PTS from the video transcoder 700, with a difference being an offset. The output video PTS+offset corresponds to the input video PTS in the table except for jitter. The presentation time stamp jitter determination process 750 compares the video PTS+offset presentation time stamps against the extracted presentation time stamps included in the table of PTSs and DTSs 730. Based upon matching between the video time stamps computed using the offset generated from the output audio stream 744 and the extracted presentation time stamps included in the table of PTSs and DTSs 730, the presentation time stamp jitter determination process 750 determines the closest matching presentation time stamp from the table 730. A time stamp update process 760 modifies the presentation time stamp in the transcoded output video stream 742 to be the matching presentation time stamp from the table 730 identified by the presentation time stamp jitter determination process 750.

The presentation time stamp jitter determination process 750 may also retrieve a matching decode time stamp from the table 730 based upon the matching presentation time stamp. The time stamp update process 760 may also modifies the decode time stamp in the transcoded output video stream 742 to be the matching decode time stamp from the table 730 identified by the presentation time stamp jitter determination process 750.

An audio transcoder 770, if included, is used to transcode the audio stream 714 of the digital video stream (e.g., packetized elementary stream) 710. The output of the audio transcoder 770 may be combined 772 with the transcoded video stream with adjusted presentation time stamps and decode time stamps 762, such as into a packetized elementary stream 474. Also, the audio stream 714 may pass-through 771 (which may include a buffer) to the combiner 772.

As previously discussed, the transcoded video stream from the video transcoder 700 has a tendency to include some jitter, especially in the case when the video frames from the input and output do not have a one-to-one correlation. The lack of one-to-one correlation primarily occurs in the situation where the video transcoding modifies the field rate and/or frame rate of the video stream.

Figure 8:
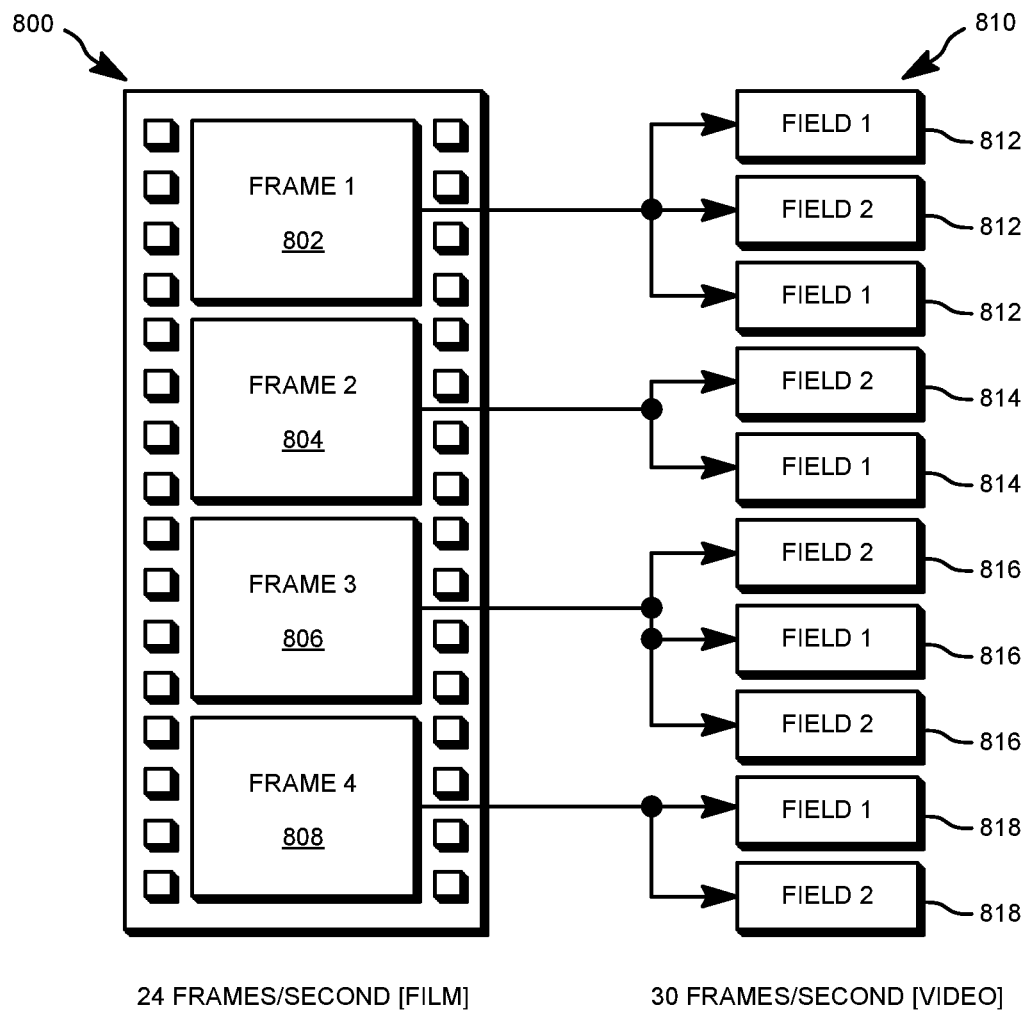
FIG. 8 illustrates a 3:2 pulldown technique.

As previously mentioned, one of the frame rate conversions is the 3:2 pulldown technique that converts 24 frames per second into 29.97 (or 30) frames per second. Referring to FIG. 8, a set of frames 800 representative of film at 24 frames/second and a set of fields 810 representative of video at 30 frames/second (60 fields/second) are illustrated. Typically, a first frame 802 is transferred to three fields 812 of the set of fields 810. Typically, a second frame 804 is transferred to two fields 814 of the set of fields 810. Typically, a third frame 806 is transferred to three fields 816 of the set of fields 810. Typically, a fourth frame 808 is transferred to two fields 814 of the set of fields 810. In this manner, the process may be repeated for the video transcoder 700. It is also noted that the fields used for the frames alternate their field selection. For example, frame 802 includes field 1/field 2/field 1, while frame 806 includes field 2/field 1/field 2. For example, frame 804 includes field 2/field 1, while frame 808 includes field 1/field 2.

In the case of video content at 23.98 frames/second the presentation time stamps should have a difference of 3754/3754/3754/3753 (with a 90 kHz clock resolution) between frames when properly incremented. As a result of the 3:2 pulldown process the fields 810 should have presentation time stamps that are offset based upon the presentation time stamp of each frame 800. For example, the frame 802 should result in 3 fields 812, and accordingly the presentation time stamps of the 3 fields 812 should be offset by 1502/1501/1502. For example, the frame 804 should result in 2 fields 814, and accordingly the presentation time stamps of the 2 fields 814 should be offset by 1501/1502. In addition to the likelihood of jitter from the video transcoder 700 for the presentation time stamps of the fields matching those of the frames in a one-to-one manner, there is also a likelihood of jitter for the presentation time stamps in the remaining fields of the conversion process that does not match those of the frames in a one-to-one manner.

To accommodate for the possibility of jitter in the fields that are not matching that of the frames, such as a result of the 3:2 pulldown technique, the table 700 may further be expanded to create additional presentation time stamps for the frames 800. For example for frame 802, the second field 2 and the third field 1 may be provided a corresponding presentation time stamp in the table 700, such as the presentation time stamp for frame 802 incremented by 1501 and incremented by 1501+1502, respectively. For example for frame 806, the second field 1 and the third field 2 may be provided a corresponding presentation time stamp in the table 700, such as the presentation time stamp for frame 806 incremented by 1502 and incremented by 1502+1501, respectively. For example, for frame 804, the second field 1 may be provided a corresponding presentation time stamp in the table 700, such as the presentation time stamp for frame 804 incremented by 1501. For example, for frame 808, the second field 2 may be provided a corresponding presentation time stamp in the table 700, such as the presentation time stamp for frame 808 incremented by 1502. In a similar manner, to accommodate for the possibility of jitter in the fields that are not matching that of the frames, the table 700 may further be expanded to create additional decode time stamps for the frames 800.

The presentation time stamp jitter determination process 750 may retrieve a matching presentation time stamp from the expanded table 730. The time stamp update process 760 may also modify the presentation time stamp in the transcoded output video stream 742 to be the matching presentation time stamp from the expanded table 730 identified by the presentation time stamp jitter determination process 750. The presentation time stamp jitter determination process 750 may also retrieve a matching decode time stamp from the expanded table 730 based upon the matching presentation or decode time stamp. The time stamp update process 760 may also modifies the decode time stamp in the transcoded output video stream 742 to be the matching decode time stamp from the expanded table 730 identified by the presentation time stamp jitter determination process 750. In this manner, the presentation time stamps and the decode time stamps may be updated accordingly to reduce jitter, even though a corresponding frame was not present in the source video content.

Often, the video stream includes multiple video clips that are streamed together in a serial fashion with one another. As a result of having multiple video clips that are streamed together, the presentation time stamps between respective video clips normally includes a discontinuity. This discontinuity in the presentation time stamps also occurs when a video clip wraps around its end in a serial presentation.

The video transcoder 700 unfortunately often processes the input video stream in a manner where any discontinuity in the presentation time stamps, typically associated with different video segments, results in a discontinuity of the presentation time stamps in the transcoded video stream not being aligned with the discontinuity in the presentation time stamps of the input video stream. Accordingly, the presentation time stamps of the transcoded video stream for a first video segment may be sequentially extended into a portion of a second video segment temporally after the first video segment. Accordingly, the presentation time stamps of the transcoded video stream for the second video segment may be sequentially extended into a portion of the first video segment temporally prior to the second video segment.

Unfortunately, when attempting to modify the resulting video stream to account for jitter and modifying the resulting video stream to account for offsets in the presentation time stamps, it may be difficult to accurately determine the proper location of the discontinuity based upon the presentation time stamps of the input video stream. Moreover, if the presentation time stamps from the video transcoder appear to be in error, often the frames associated with the presentation time stamps are discarded as being in error. Further, when attempting an advertisement insertion process into the transcoded video stream, it is problematic to insert the advertisement in the discontinuity between the segments since the discontinuity in the presentation time stamps does not necessarily match the discontinuity in the video frames.

To accommodate for the possibility of presentation time stamps not suitably matching up in an area of a discontinuity, the table 700 may further be expanded to create additional presentation time stamps for the frames 800 proximate those areas of a discontinuity in the series of the presentation time stamps. A discontinuity in the presentation time stamps may be determined based upon the anticipated sequence of increments in the presentation time stamps being substantially different than what is expected, such as a difference of greater than 5%.

Figure 9:
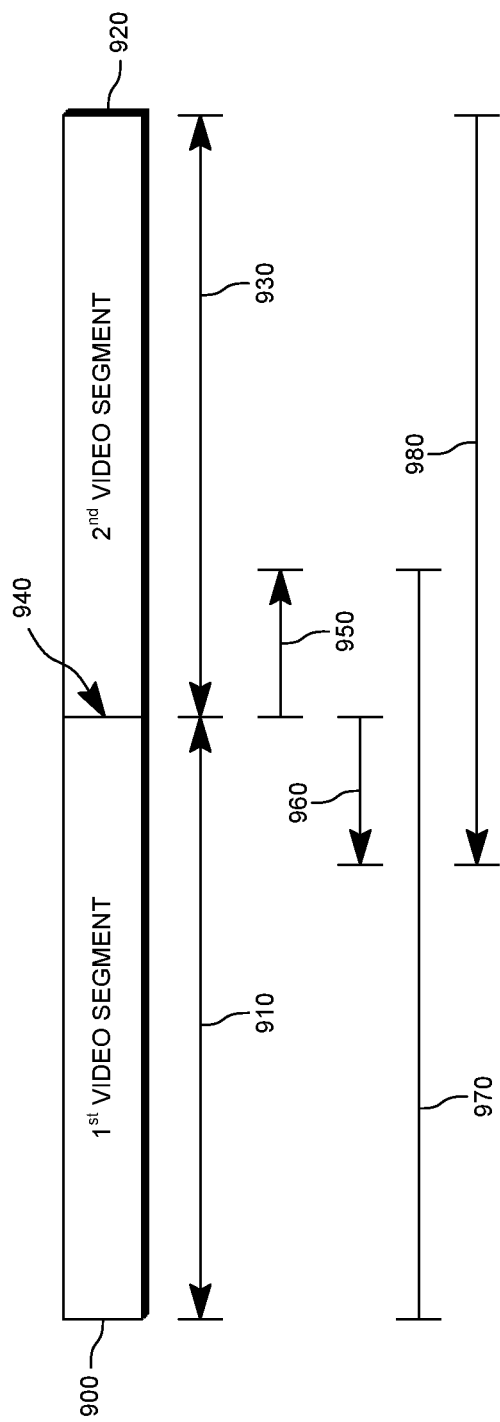
FIG. 9 illustrates expanded presentation time stamps for two video segments.

Referring to FIG. 9, the table 700 is expanded to include a series of additional presentation time stamps. A first video segment 900 may include an associated set of video frames and presentation time stamps 910. A second video segment 920 may include an associated set of video frames and presentation time stamps 930. A discontinuity 940 exists in between the first video segment 900 and the second video segment 920 which also is expressed as a discontinuity in the presentation time stamps of the first video segment 900 and the second video segment 920. When a discontinuity is identified in the presentation time stamps, such as by a sequence of the presentation time stamps including a sufficient discontinuity, the table 700 is expanded with additional presentation time stamps. A first expanded series of presentation time stamps 950 is determined virtually extending (in a forward manner) the presentation time stamps of the first video segment 900, while there is no actual corresponding video frames for the first expanded series of presentation time stamps 950. A second expanded series of presentation time stamps 960 is determined virtually extending (in a backward manner) the presentation time stamps of the second video segment 920, while there is no actual corresponding video frames for the second expanded series of presentation time stamps 960. The result is a set of presentation time stamps 970 for the first video segment 900 and a set of presentation time stamps 980 for the second video segment 920. By way of example, the first expanded series of presentation time stamps 950 and the second expanded series of presentation time stamps 960 may be 1 second in duration.

With the expanded table 700 to include the additional presentation time stamps, these presentation time stamps may be used with the jitter reduction process and/or with the delta presentation time stamp determination process for accurate adjustments.

The offset process, the jitter process, and/or the discontinuity may be combined with one another, as desired. In addition, the table may be in any format or manner, inclusive of any data structure or otherwise, stored in memory or a storage device.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A method for transcoding a digital video stream comprising:
    (a) receiving a digital video stream that includes an input video stream and an input audio stream as part of an input audiovisual stream;
    (b) extracting a first set of presentation time stamps from said input video stream;
    (c) embedding said first set of presentation time stamps into a first audio stream in a first location, where said first audio stream is not received as part of said input audiovisual stream;
    (d) providing said input video stream together with said first audio stream to a video transcoder in a synchronized manner with each other;
    (e) transcoding by said video transcoder said input video stream including said first set of presentation time stamps from an initial set of characteristics to a modified set of characteristics including a second set of presentation time stamps that are different from said first set of presentation time stamps, and providing said transcoded input video stream and said first audio stream from said video transcoder in a synchronized manner with each other;
    (f) determining an offset of said second set of presentation time stamps of said transcoded input video stream based upon said first set of presentation time stamps embedded in said first audio stream from said video transcoder;
    (g) combining said transcoded video stream and said input audio stream based upon said offset into an output audiovisual stream without said first audio stream.

2. The method of claim 1 wherein said input video stream includes video frames and said input audio stream includes audio frames, where said input video stream and said input audio stream are received as an input packetized elementary stream.

3. The method of claim 1 wherein said first location includes at least one of (1) a transport stream packet table 2-2; (2) a transport stream adaptation field table 2-6; (3) a packetized elementary stream packet table 2-17; (4) a packetized elementary stream packet header; (5) a packetized elementary stream packet data byte field; (6) a descriptor within a program stream; (7) a descriptor within a transport stream; and (8) a private section table 2-30.

4. The method of claim 1 wherein said first audio stream is free from being transcoded by said transcoder.

5. The method of claim 1 wherein said first audio stream is transcoded by said transcoder.

6. The method of claim 1 wherein said transcoded video stream includes video frames and said first audio stream includes audio frames.

7. The method of claim 1 wherein said combining said transcoded video stream and said input audio stream based upon said offset is a packetized elementary stream.

8. The method of claim 1 wherein said input audio stream is transcoded by said an audio transcoder.

9. The method of claim 8 wherein said transcoded video stream includes video frames and said transcoded audio stream includes audio frames, where said transcoded video stream and said transcoded audio stream are provided as an output packetized elementary stream.

* * * * *